United States Patent
Mosley

(10) Patent No.: US 12,471,739 B1
(45) Date of Patent: Nov. 18, 2025

(54) COUNTERTOP APPLIANCE WITH INTEGRATED ICE DISPENSER AND DUAL MIXING MECHANISMS

(71) Applicant: Sheila Mosley, Chickasha, OK (US)

(72) Inventor: Sheila Mosley, Chickasha, OK (US)

( * ) Notice: Subject to any disclaimer, the term of this patent is extended or adjusted under 35 U.S.C. 154(b) by 0 days.

(21) Appl. No.: 19/305,904

(22) Filed: Aug. 21, 2025

(51) Int. Cl.

| | |
|---|---|
| *F25D 23/12* | (2006.01) |
| *A47J 43/044* | (2006.01) |
| *A47J 43/046* | (2006.01) |
| *A47J 43/08* | (2006.01) |
| *B01F 27/806* | (2022.01) |
| *B01F 27/808* | (2022.01) |
| *B01F 27/85* | (2022.01) |
| *B01F 35/32* | (2022.01) |
| *B01F 101/00* | (2022.01) |

(52) U.S. Cl.
CPC .......... *A47J 43/044* (2013.01); *A47J 43/046* (2013.01); *A47J 43/082* (2013.01); *A47J 43/085* (2013.01); *B01F 27/806* (2022.01); *B01F 27/808* (2022.01); *B01F 27/85* (2022.01); *B01F 35/3204* (2022.01); *A47J 2043/04472* (2013.01); *B01F 2101/1805* (2022.01)

(58) Field of Classification Search
CPC ...... A47J 43/044; A47J 43/046; A47J 43/082; A47J 43/085; A47J 2043/04472; B01F 27/806; B01F 27/808; B01F 27/85; B01F 35/3204; B01F 2101/1805
See application file for complete search history.

(56) References Cited

U.S. PATENT DOCUMENTS

| | | | | |
|---|---|---|---|---|
| 6,164,575 | A * | 12/2000 | Karkos, Jr. ............ | A47J 43/07 241/199.12 |
| 9,474,417 | B1* | 10/2016 | Pryor, Jr. ................ | B01F 33/82 |
| 9,915,467 | B1* | 3/2018 | Mosley ............... | B67D 1/0894 |
| 10,928,121 | B1 | 2/2021 | Robinson | |
| 2001/0002892 | A1* | 6/2001 | Karkos, Jr. ............ | A23G 9/045 366/314 |
| 2002/0131324 | A1* | 9/2002 | Farrell ..................... | A23G 9/12 366/147 |
| 2012/0087203 | A1* | 4/2012 | Williams .............. | B01F 27/806 99/460 |
| 2012/0104022 | A1* | 5/2012 | Boarman ............. | B67D 3/0012 99/275 |

(Continued)

*Primary Examiner* — Bob Zadeh
(74) *Attorney, Agent, or Firm* — Dale J. Ream

(57) ABSTRACT

A multifunctional countertop kitchen appliance includes a housing that supports an ice and water dispenser assembly and a dual-mode mixing assembly configured to prepare blended beverages. The mixing assembly includes a first mixing mechanism located in a lower compartment of the housing, comprising a first motor and actuator operable to rotate a blade member within a cup that is selectively and releasably coupled to the actuator. A second mixing mechanism is located in an upper compartment and includes a second motor driving an elongate mixing rod having a distal mixing blade configured to extend into a pitcher for mixing contents therein. Both mechanisms may operate via independent or shared motors and controls. In some embodiments, the appliance is integrated into a refrigerator door. The system is adaptable to multiple vessel types and streamlines beverage preparation by combining dispensing and mixing functions within a single unit.

16 Claims, 7 Drawing Sheets

(56) References Cited

U.S. PATENT DOCUMENTS

2014/0212566 A1* 7/2014 Herbert .................... A23G 9/04
　　　　　　　　　　　　　　　　　　　　　　99/287
2018/0354773 A1* 12/2018 Cronin .................. A47J 31/521

* cited by examiner

COUNTERTOP APPLIANCE WITH INTEGRATED ICE DISPENSER AND DUAL MIXING MECHANISMS

REFERENCE TO RELATED APPLICATIONS

This is a non-provisional application that is related to non-provisional application Ser. No. 15/342,071 filed Nov. 2, 2016 now U.S. Pat. No. 9,915,467.

BACKGROUND OF THE INVENTION

The present invention relates generally to kitchen appliances, and more particularly, to a countertop appliance with integrated beverage dispensing and dual mixing capabilities for preparing beverages such as smoothies, shakes, and other liquid-based drinks.

Traditional beverage preparation appliances such as blenders and mixers are often standalone devices requiring manual setup and do not integrate with ice or water dispensing systems. While refrigerators often include ice and water dispensers, they lack built-in functionality for mixing or preparing beverages directly at the dispensing location. Consumers seeking to prepare a cold beverage must typically retrieve ice and water from a dispenser, then transfer those ingredients to a separate blending or mixing apparatus.

Moreover, existing appliances are limited in flexibility and are often designed for use with either a cup or a pitcher but not both. There remains a need for a compact and multifunctional appliance capable of dispensing ice and water and accommodating various vessel types, and mixing contents using multiple mechanisms within a unified system. It would be desirable to have a multifunctional appliance that includes a drinking vessel that may be first coupled to the appliance for mixing a beverage and then removed therefrom for immediate drinking thereof.

SUMMARY OF THE INVENTION

In accordance with various embodiments, the present invention provides a countertop kitchen appliance configured to dispense ice and water and to mix beverage contents using two distinct mixing mechanisms.

The appliance includes a housing supporting an ice and water dispenser assembly similar in construction to those found on modern refrigerators. The housing further defines a lower compartment and an upper compartment. A first mixing mechanism is housed in the lower compartment and is configured for use with a drinking cup. This mechanism includes a first motor, a first actuator rotatable by the motor, and a releasable interface for coupling to the bottom of a cup. A blade member (coupled to the interface) within the cup is rotated during operation to mix the contents.

A second mixing mechanism is positioned in the upper compartment and is configured for use with a larger vessel, such as a pitcher. This mechanism includes a second motor operably coupled to an elongate mixing rod that extends downwardly into the pitcher. A mixing blade at the distal end of the rod stirs the liquid contents within the pitcher when the second motor is energized.

In some embodiments, the first and second mixing mechanisms may be controlled via shared or separate user interfaces and may be powered by independent batteries or a common motor assembly. In certain implementations, the entire appliance may be integrated into a refrigerator door for added convenience and compactness.

Therefore, a general object of the present invention is to provide a multifunctional beverage appliance that combines ice and water dispensing with integrated mixing capabilities for greater efficiency and convenience in beverage preparation.

Another object of the invention is to offer a dual-mode mixing system capable of automatically adapting to different vessel types—specifically a cup or a pitcher—using dedicated or shared motorized components.

Yet another object of the invention is to reduce the number of required kitchen appliances by consolidating dispensing, blending, and mixing functions into a single countertop or refrigerator-integrated unit, thereby saving counter space and simplifying operation.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 3 is an exploded view of the countertop appliance as in FIG. 1a;

DESCRIPTION OF THE PREFERRED EMBODIMENT

Figure 1A:
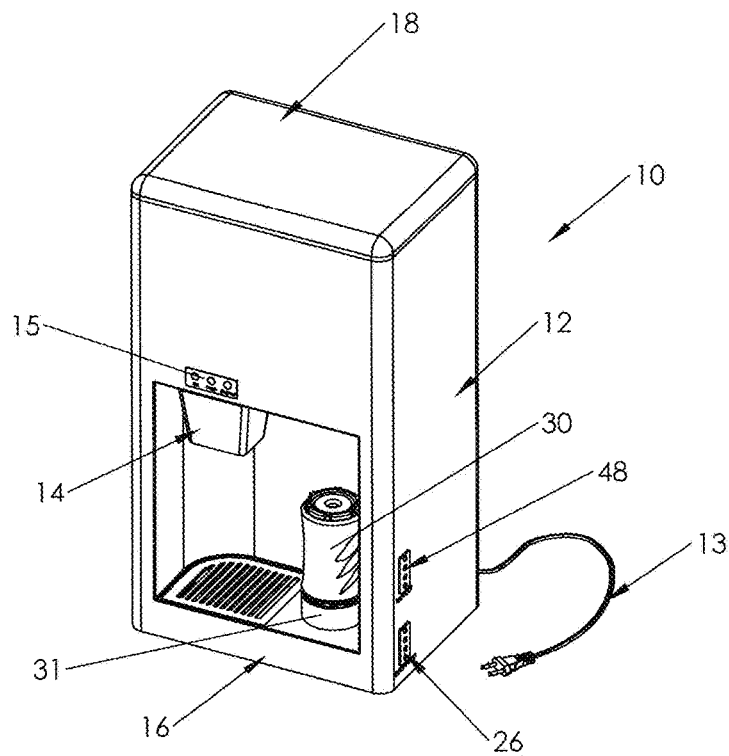
FIG. 1a is a perspective view of a countertop appliance according to the present invention, illustrating usage of a lower mixing assembly.
Figure 1B:
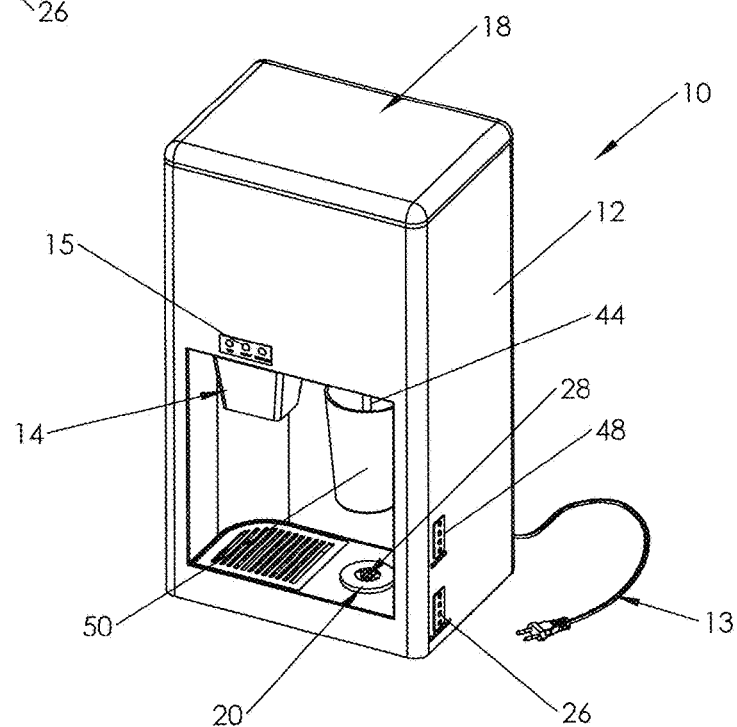
FIG. 1b is another perspective view of the countertop appliance as in FIG. 1a, illustrating usage of an upper fixing assembly.
Figure 2A:
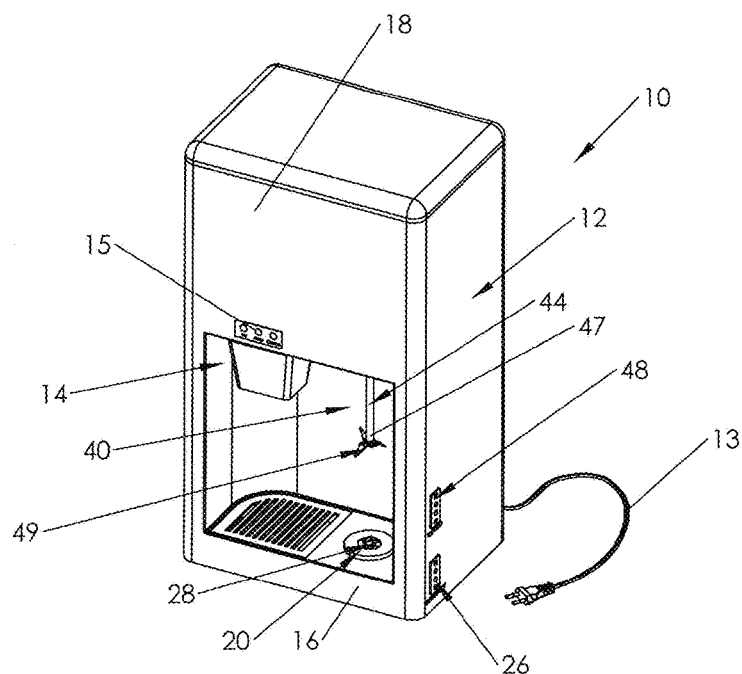
FIG. 2a is another perspective view of the countertop appliance, illustrating the upper mixing assembly in a deployed configuration.
Figure 2B:
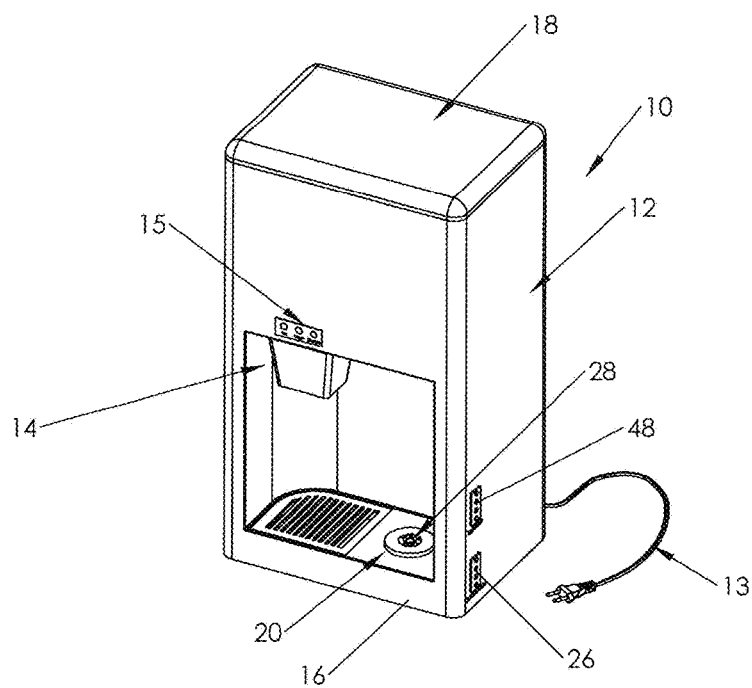
FIG. 2b is another perspective view of the countertop appliance as in FIG. 2a, illustrated with the upper mixing assembly in a retracted configuration.
Figure 3:
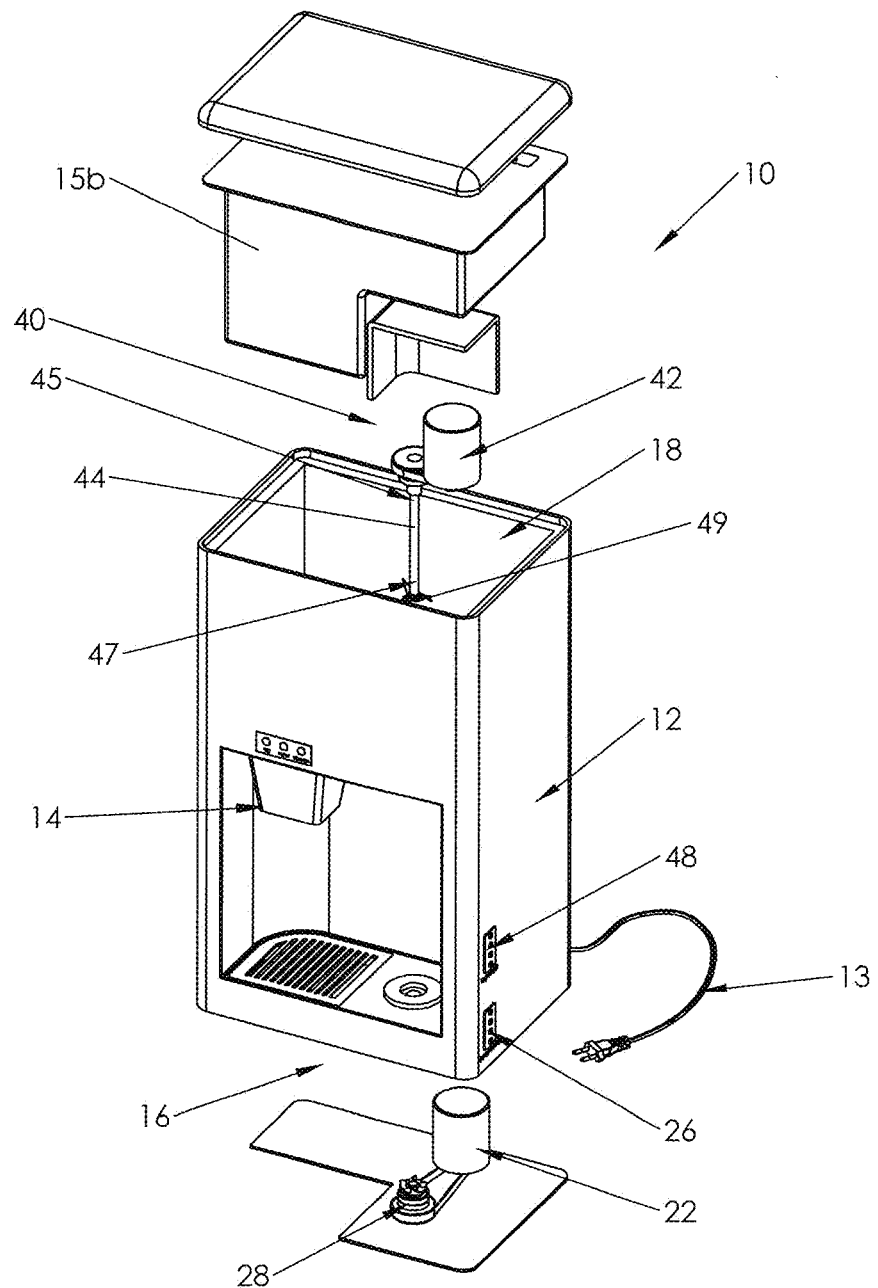
Figure 4:
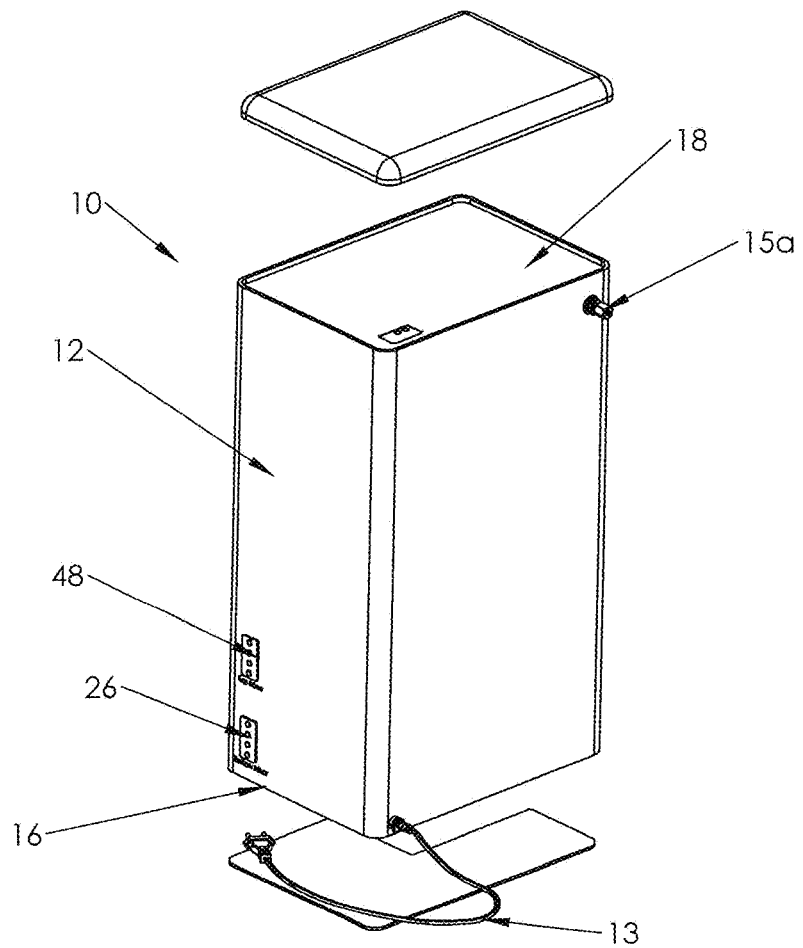
FIG. 4 is a partially exploded rear view of the countertop appliance as in FIG. 3.
Figure 5:
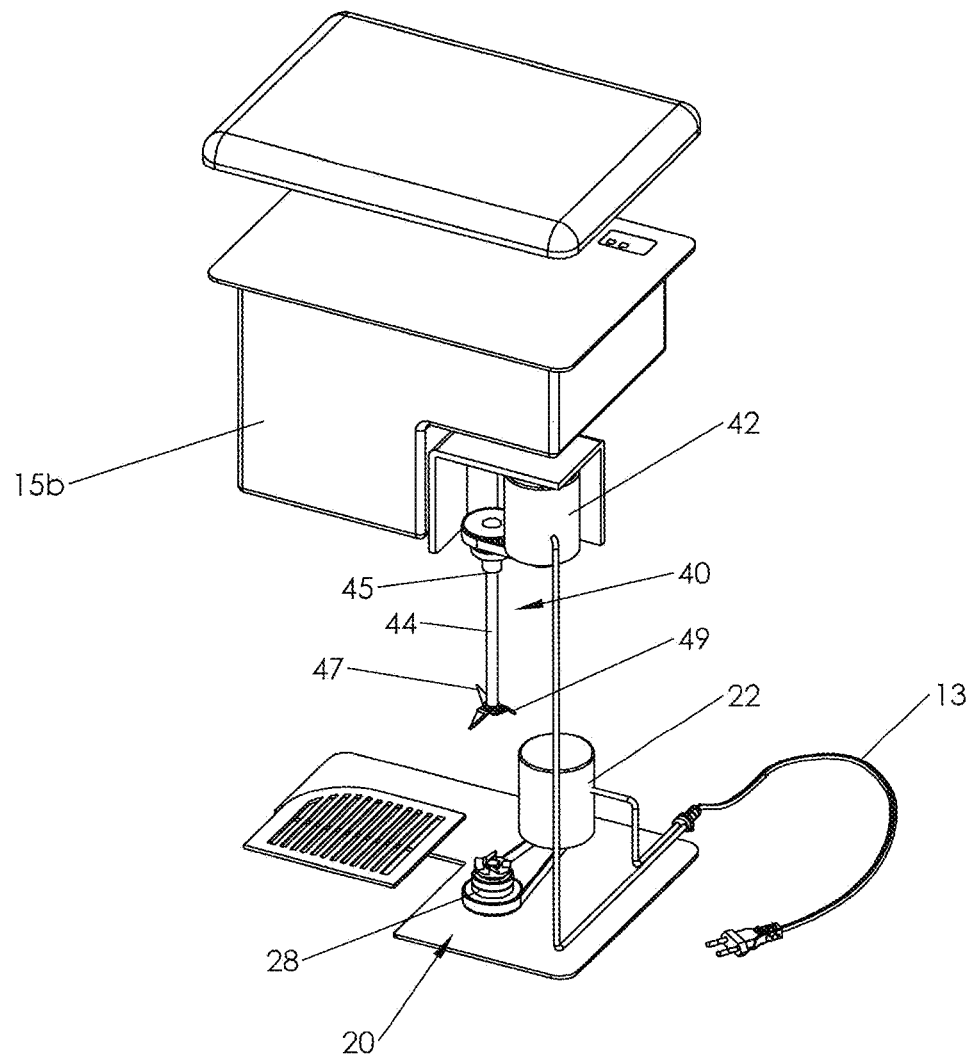
FIG. 5 is another partially exploded view of the countertop appliance as in FIG. 4 with the housing removed for clarity.
Figure 6A:
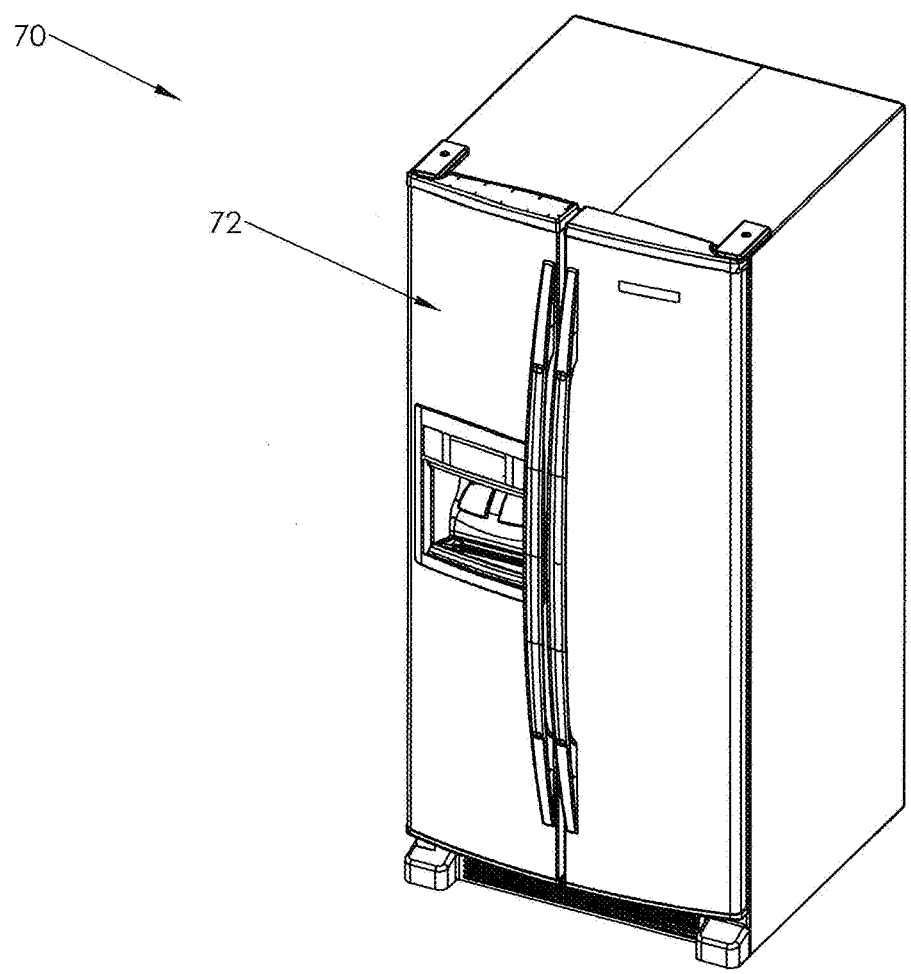
FIG. 6a is a perspective view of an integrated ice-water assembly and dual mixing assemblies installed in an otherwise traditional refrigerator door.
Figure 6B:
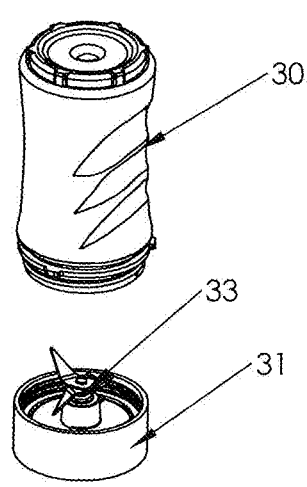
FIG. 6b is an isolated view on an enlarged scale of a cup associated with the lower mixing assembly.
Figure 6C:
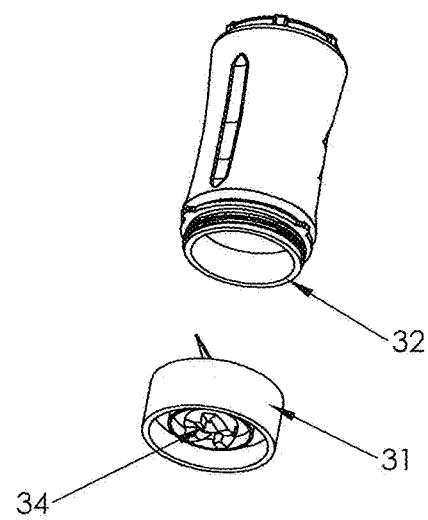
FIG. 6c is a lower perspective view of the cup as in FIG. 6b.
Figure 7:
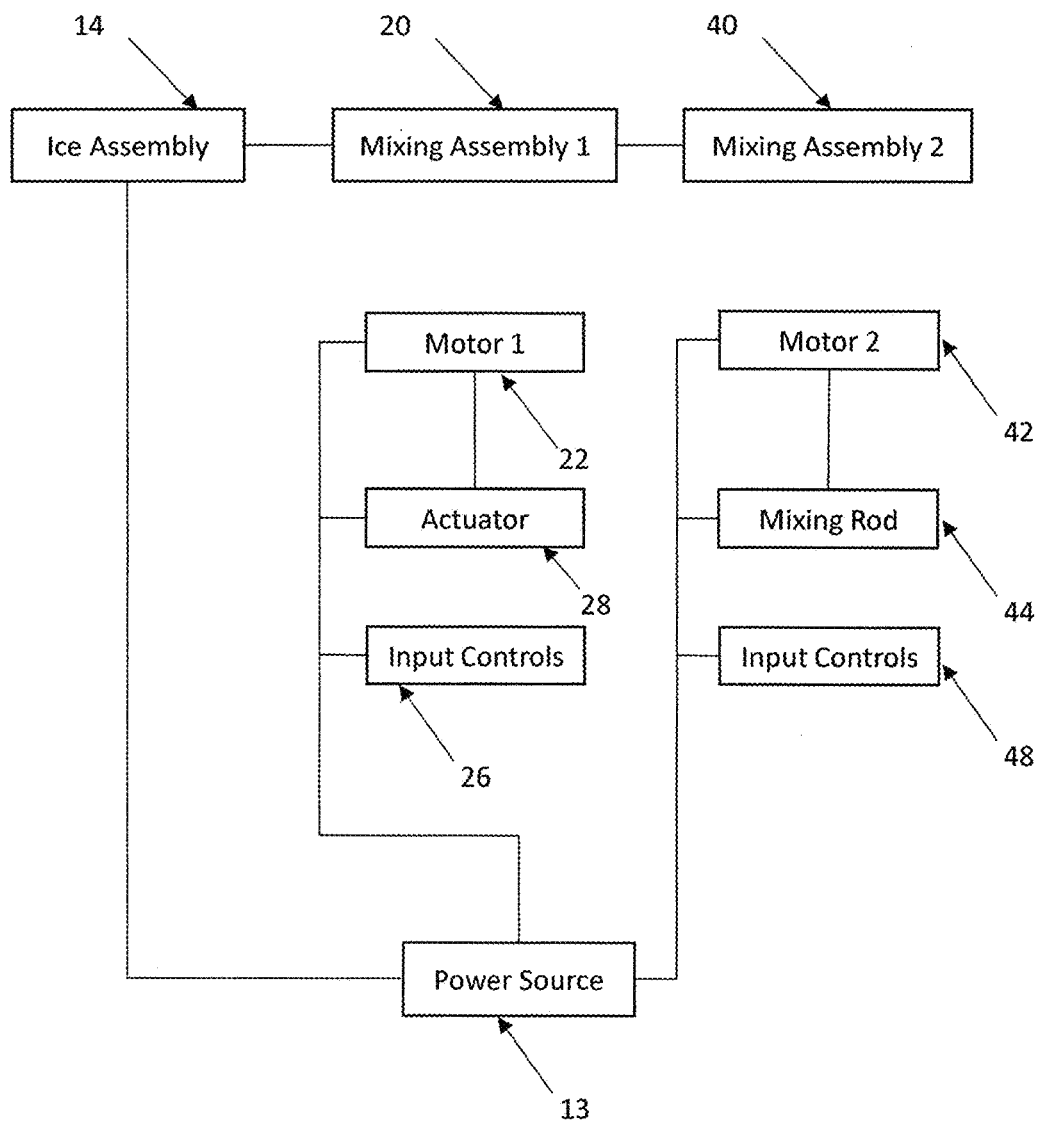
FIG. 7 is a block diagram of a countertop appliance according to the preferred embodiment of the present invention.

Referring now to the embodiments described herein, and with reference to the accompanying figures, a countertop kitchen appliance 10 is disclosed. The appliance 10 is configured for dispensing water and ice and for mixing beverages using two alternative mixing mechanisms, each adapted to a different type of drinking vessel.

The appliance 10 includes a housing 12 that supports and encloses the internal components. Disposed on a front-facing surface of the housing 12 is an ice and water dispenser assembly 14, which includes conventional dispensing nozzles and actuators for delivering chilled water and ice into a drinking vessel. The dispenser assembly 14 may be plumbed into a water line 15*a* and ice maker in a manner similar to conventional refrigerator-mounted dispensers. The details of an icemaker are well-known and, therefore, not illustrated in detail. Further, the housing 12 may include an ice reservoir 15*b* configured to hold and store ice cubes/pieces. In an embodiment, the ice reservoir 15*b* may include an insulated compartment, an input module 15, and other refrigeration components.

The housing 12 defines two primary internal compartments: a lower compartment 16 positioned at or near the base of the housing 12, and an upper compartment 18 positioned adjacent a top wall of the housing 12. These compartments house the respective mixing mechanisms described below.

A first mixing mechanism 20 is positioned within the lower compartment 16 and is configured for use with a cup-style drinking vessel 30. The first mixing mechanism 20 may include a first motor 22 that is mounted inside the lower compartment 16. The first motor 22 is electrically connected to a first power source such as a first battery or to the AC electrical power cord 13, which provides power for operation. A set of first input controls 26 are accessible on an exterior surface of the housing 12 and are configured to send control signals to the first motor 22. The first input controls 26 may include buttons, switches, dials, touch-screen interface, and the like.

The first mixing mechanism 20 may include a first actuator 28. More particularly, the first motor 22 drives a first actuator 28 (such as with a belt connection) when energized, the first motor 22 and first actuator 28 being fixedly mounted in the lower compartment 16. The cup 30 includes a lower portion 31 releasably coupled to a main portion, such as in a threaded relationship, the lower portion 31 having a bottom wall 32 with a rotatable interface 34 that is shaped and dimensioned to be selectively and releasably coupled to the first actuator 28. When coupled, the rotation of the actuator 28 is transferred to the interface 34. A blade member 33 is secured to the interface 34 and extends upwardly into an interior region of the cup 30. Upon activation of the first motor 22, the actuator 28 rotates the interface 34 and the blade member 33, thereby mixing the contents held within the cup 30. After mixing, the cup 30 may be removed from the housing 12, inverting the cup 30 and upright configuration, and threadably releasing the lower portion 31 to reveal the open end and used directly as a drinking vessel.

A second mixing mechanism 40 is disposed within the upper compartment 18 and is adapted for use with a pitcher-style drinking vessel 50. The second mixing mechanism 40 includes a second motor 42 mounted inside the upper compartment 18, and operably connected to an elongate mixing rod 44. The second motor 42 is powered by a second power source (such as a second battery or electrical connection to the AC power cord 13) and its operation is governed by second input controls 48 that are likewise accessible on the housing 12. More particularly, the set of second input controls 48 are accessible on an exterior surface of the housing 12 and are configured to send control signals to the second motor 42. The second input controls 48 may include buttons, switches, dials, touch-screen interface, and the like.

The mixing rod 44 includes a proximal end 45 coupled to the second motor 42 and a distal end 47 opposite the proximal end 45 that terminates in a mixing blade 49. The mixing rod 44 is configured to extend downwardly from the upper compartment 18 into the interior area of the pitcher 50 when the pitcher is positioned in vertical alignment with the mixing mechanism 40. When the second motor 42 is energized via the input controls 48, the mixing blade 49 rotates and stirs the liquid contents within the pitcher 50 to form a blended beverage.

In certain embodiments, the appliance 10 may be constructed so that both the first mixing mechanism 20 and the second mixing mechanism 40 are operably connected to a shared motor and shared control system, thereby reducing component redundancy. A switching mechanism (not shown) may be used to direct power and control to the appropriate mixing mechanism based on vessel detection or user selection.

In another embodiment, the housing 12 of the appliance 10 may be integrated into the front door 70 of a refrigerator 72, wherein the ice and water dispenser assembly 14, as well as the mixing mechanisms 20 and 40, are built directly into the door structure. This integrated design allows a user to retrieve ice, water, and blended beverages from a unified interface without needing to move between multiple appliances.

The appliance 10 may be manufactured from a combination of durable plastic, stainless steel, and food-safe materials. The batteries (if implemented) may be rechargeable lithium-ion cells, and in some configurations, the appliance may receive power from a wall outlet via a standard AC power cord 13. The mixing rod 44 may include telescoping or retractable elements to accommodate pitchers of different heights, and sensors may optionally be included within the housing 12 to detect the presence and type of vessel—such as cup 30 or pitcher 50—and automatically configure the motor output accordingly.

While the embodiments described provide specific configurations and components, the scope of the invention is not limited to the particular structures disclosed. Modifications and substitutions of equivalents will be apparent to one of ordinary skill in the art and are intended to be included within the scope of the appended claims.

It is understood that while certain forms of this invention have been illustrated and described, it is not limited thereto except insofar as such limitations are included in the following claims and allowable functional equivalents thereof.

What is claimed is:
1. A countertop kitchen appliance, comprising:
   a housing defining a lower compartment and an upper compartment;
   an ice and water dispenser assembly operably positioned on a front panel of the housing;
   a mixing assembly operably positioned on said front panel of the housing adjacent to said ice and water dispenser assembly, said mixing assembly including (1) a first mixing mechanism and (2) a second mixing mechanism;
   wherein said first mixing mechanism includes:
      a first motor situated in said lower compartment and operably coupled to a first actuator, the first actuator being configured to rotate when energized;
      a first power source electrically coupled to the first motor;
      a first input control electrically connected to the first power source and to the first motor;
   wherein said second mixing mechanism includes:
      a second motor situated in said upper compartment and operably coupled to an elongate mixing rod, the elongate mixing rod having a first end coupled to the second motor and a second end having a mixing blade;

a second power source electrically coupled to the second motor;

a second input control electrically connected to the second power source and to the second motor;

a drinking vessel selectively positionable within the housing and configured to receive liquid contents therein, the drinking vessel including:

a cup having a bottom wall with an interface that is selectively and releasably coupled to the first actuator and configured to rotate therewith; when said first motor is energized;

a blade member disposed within the cup and operatively coupled to the interface so as to rotate therewith for mixing contents within the cup; and a pitcher selectively positionable under the second mixing mechanism and configured to receive the elongate mixing rod therein such that the mixing blade extends into the interior of the pitcher.

2. The appliance of claim 1, wherein the interface of the cup includes a coupling element shaped to interlock with the first actuator via a frictional or mechanical engagement.

3. The appliance of claim 1, wherein the drinking vessel is removably coupled to the housing for use as a portable drinking container after mixing.

4. The appliance of claim 1, wherein the first input controls and the second input controls are integrated into a touch-screen user interface disposed on an exterior surface of the housing.

5. The appliance of claim 1, wherein the mixing rod of the second mixing mechanism is retractable into the upper compartment when not in use.

6. The appliance of claim 1, wherein the first motor and the second motor are replaced by a single shared motor operably connected to both the first actuator and the elongate mixing rod via respective actuating mechanisms.

7. The appliance of claim 1, wherein the housing is integrated into a door of a refrigerator.

8. The appliance of claim 1, wherein the blade member of the cup is centrally located within the interior of the cup and configured to rotate along a vertical axis.

9. The appliance of claim 1, wherein the ice and water dispenser assembly is fluidly coupled to a chilled water reservoir within the appliance housing or refrigerator.

10. The appliance of claim 1, wherein the pitcher includes volume measurement indicia on its sidewall.

11. A method of preparing a mixed beverage, the method comprising:

providing a countertop appliance that includes:
a housing;
an ice and water dispenser assembly supported by the housing;
a first mixing mechanism disposed adjacent the ice and water dispenser assembly, the first mixing mechanism including (1) a first motor disposed in a lower compartment of the housing, (2) a first actuator operably coupled to the first motor, (3) a first power source electrically connected to the first motor, and (4) first input controls;
a second mixing mechanism vertically aligned with said first mixing mechanism, said second mixing mechanism including (1) a second motor disposed in an upper compartment of the housing, (2) an elongate mixing rod having a proximal end operably coupled to said second motor and a distal end having a mixing blade, (3) a second power source electrically connected to said second motor and said second input controls;

dispensing water and ice into a drinking vessel using the ice and water dispenser assembly;

positioning the drinking vessel within the housing, said positioning including:
(1) coupling an interface on a bottom wall of a cup to the first actuator and energizing the first motor via the first input controls so as to rotate the first actuator and a blade member within the cup to mix contents therein;
(2) lowering the elongate mixing rod from the upper compartment into an interior area of the pitcher and energizing a second motor via the second input controls so as to rotate the mixing blade and stir contents therein.

12. The method of claim 11, further comprising detaching the cup from the first actuator and using it as a portable drinking container after mixing.

13. The method of claim 11, wherein each of said first input controls and said second input controls includes a touch-sensitive input control panel.

14. The method of claim 11, further comprising recharging the first and second batteries through connection to AC power via a wired or wireless charging port.

15. The method of claim 11, further comprising retracting the elongate mixing rod into the upper compartment after mixing is complete.

16. The method of claim 11, further comprising integrating the housing into a refrigerator door such that the water, ice, and beverage mixing are all performed from a refrigerator interface.

* * * * *